April 6, 1965     R. J. BILODEAU     3,177,279
METHOD OF MOLDING A DECORATIVE BUILDING PANEL
Filed Oct. 19, 1961     7 Sheets-Sheet 1

INVENTOR.
ROBERT J. BILODEAU
BY
ATTORNEY

INVENTOR.
ROBERT J. BILODEAU

April 6, 1965 R. J. BILODEAU 3,177,279
METHOD OF MOLDING A DECORATIVE BUILDING PANEL
Filed Oct. 19, 1961 7 Sheets-Sheet 3
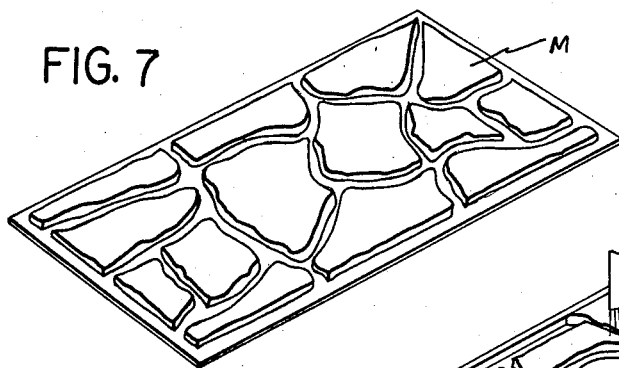
FIG. 7
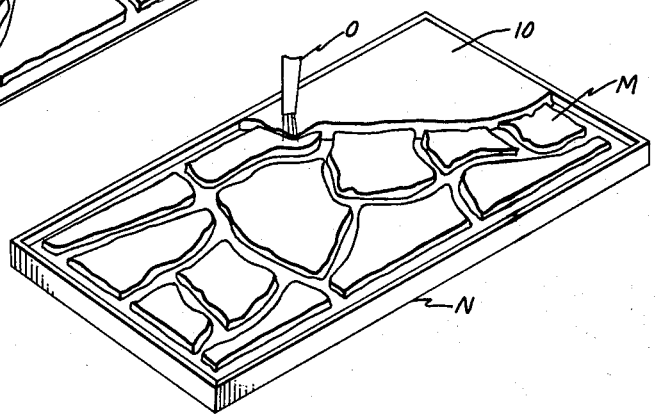
FIG. 8
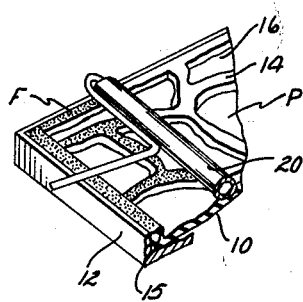
FIG. 9
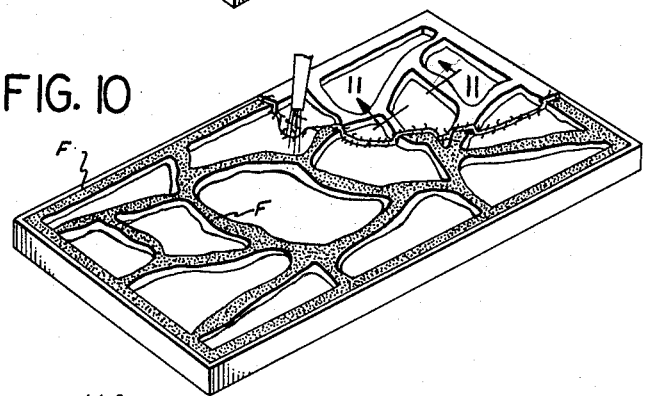
FIG. 10
FIG. 11
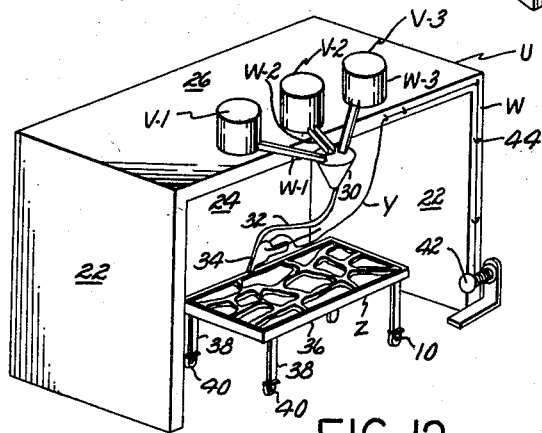
FIG. 12
INVENTOR.
ROBERT J. BILODEAU
BY
ATTORNEY

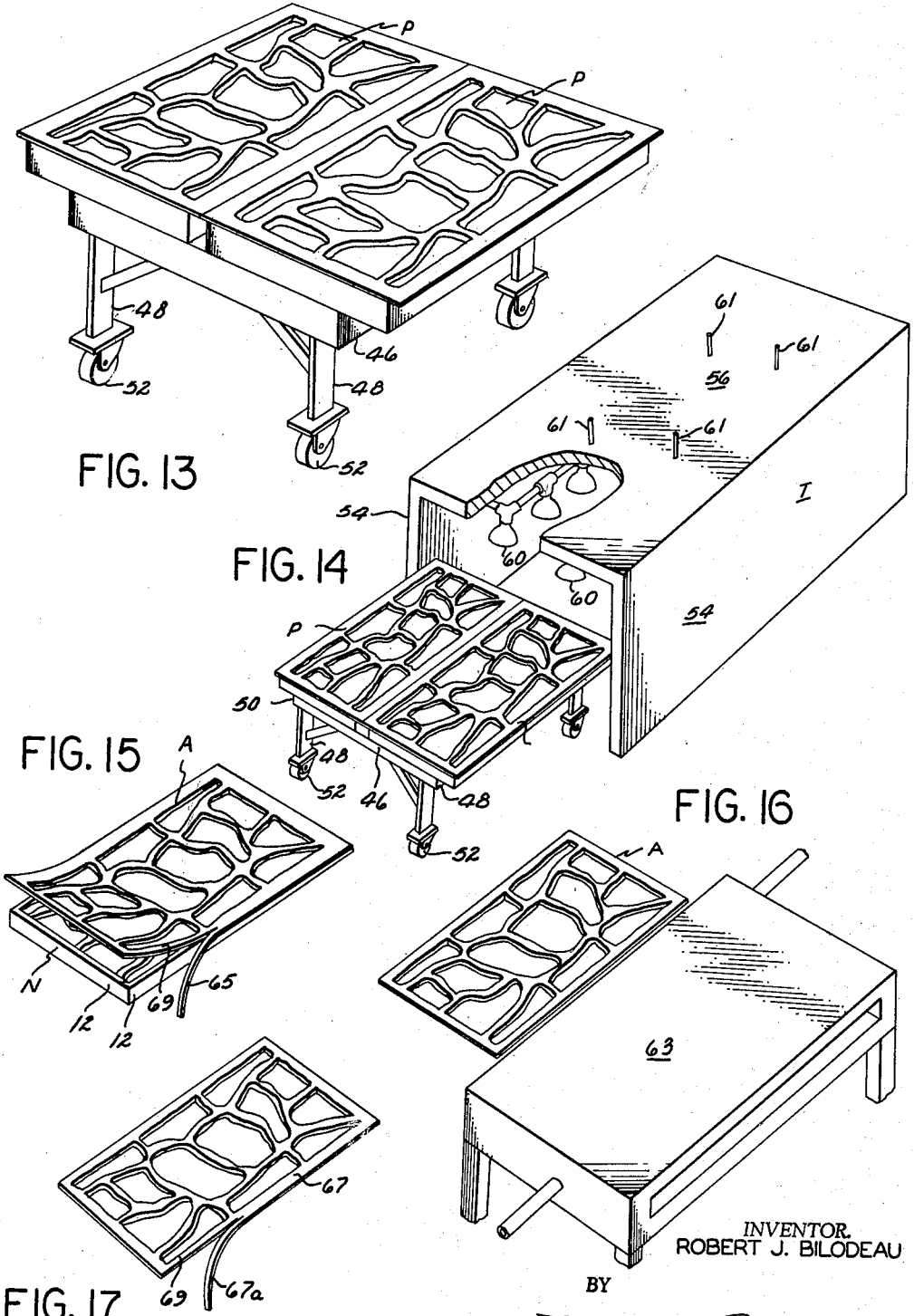

April 6, 1965  R. J. BILODEAU  3,177,279
METHOD OF MOLDING A DECORATIVE BUILDING PANEL
Filed Oct. 19, 1961  7 Sheets-Sheet 5

INVENTOR.
ROBERT J. BILODEAU
BY
ATTORNEY

April 6, 1965 R. J. BILODEAU 3,177,279
METHOD OF MOLDING A DECORATIVE BUILDING PANEL
Filed Oct. 19, 1961 7 Sheets-Sheet 6

INVENTOR.
ROBERT J. BILODEAU
BY
ATTORNEY

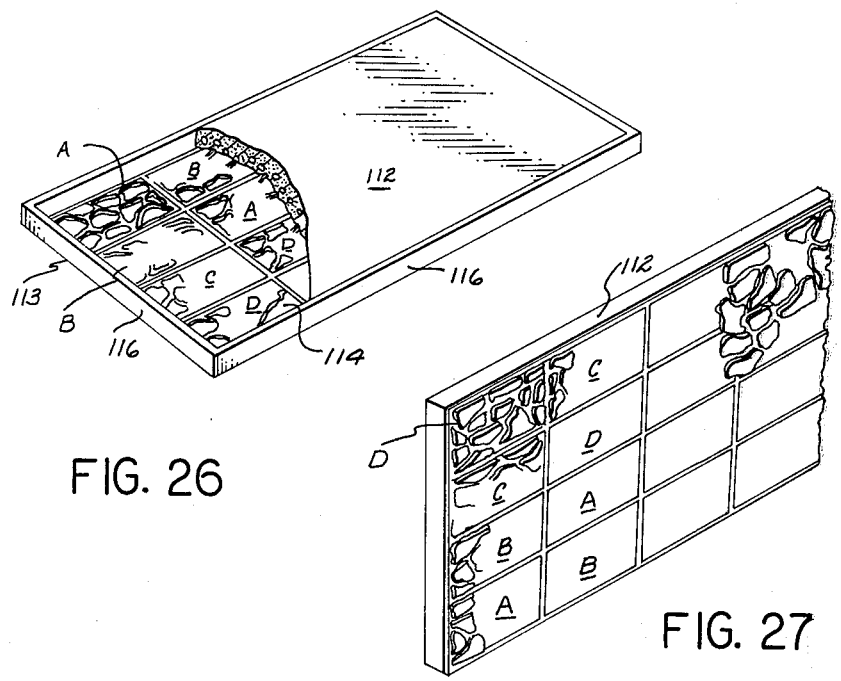
FIG. 26
FIG. 27
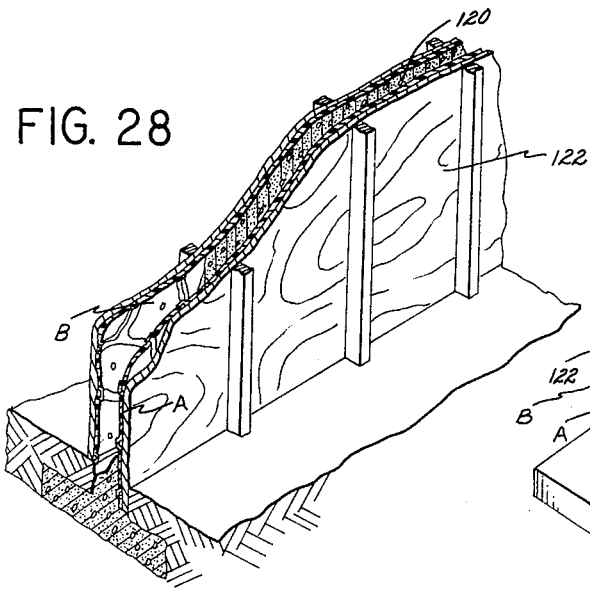
FIG. 28
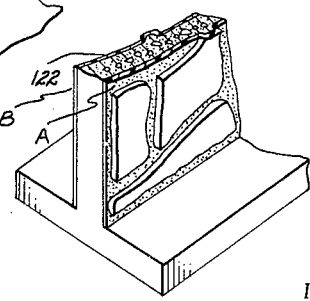
FIG. 29
*INVENTOR.*
ROBERT J. BILODEAU
BY
ATTORNEY

United States Patent Office 3,177,279
Patented Apr. 6, 1965

3,177,279
METHOD OF MOLDING A DECORATIVE BUILDING PANEL
Robert J. Bilodeau, Lakewood, Calif., assignor, by mesne assignments, to Cavrok Manufacturing Company, Rockville, Conn., a corporation of Connecticut
Filed Oct. 19, 1961, Ser. No. 146,145
2 Claims. (Cl. 264—255)

The present invention relates generally to the construction of buildings, and more particularly to a new and novel building panel that not only has the appearance of either mortared stone, brick or other block-like material, but the texture and feel thereof as well, a structure fabricated with said panels, and a method of using said panels in the construction of a building.

An object of the invention is to provide a method adapted to be used in carrying out the method whereby the actual configuration of selected stone or brick including undercut portions thereof, can be truly and accurately reproduced in relief in polymerized resin panels, which panels can be nailed in abutting contact on a desired frame structure or actually bonded to a concrete wall when placed in the forms prior to the pouring of concrete therein.

These and other objects and advantages of the invention will become apparent from the following description thereof and from the accompanying drawings illustrating the same in which:

FIGURE 7 is a perspective view of a second master form produced when the resin and Fiberglas has been stripped from the first master form shown in FIGURE 6 after polymerization of the resin. The second master form is an exact reproduction of the mortared stone section shown in FIGURE 1;

FIGURE 8 is a perspective view of the second master form shown in FIGURE 7 mounted in a supporting frame and which has had a heat-curable soft rubber material applied thereto to provide a resilient mold for use in forming one of the decorative panels shown in FIGURE 1;

Figure 1:
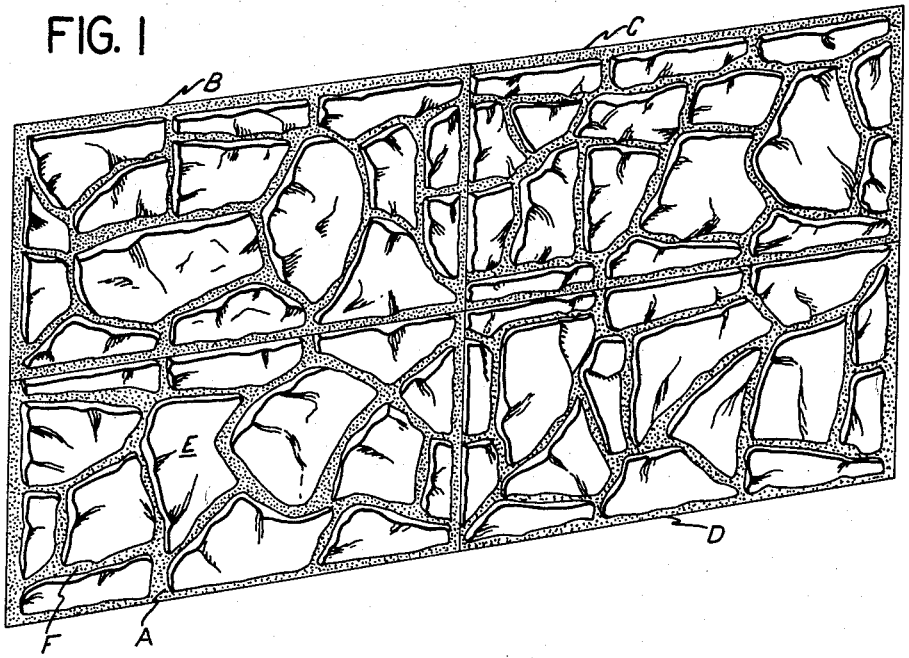
FIGURE 1 is a front perspective view of four decorative panels, each of a different design, but each of which simulate a section of a mortared stone wall, which panels are of such design that any one of them can be abutted against the ends or sides of another to complement the design thereof.
Figure 18:
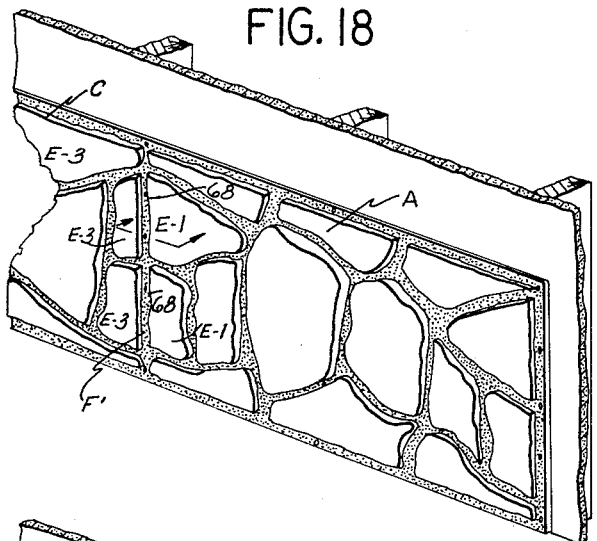
Figure 19:
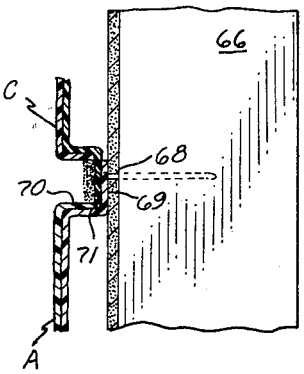
Figure 20:
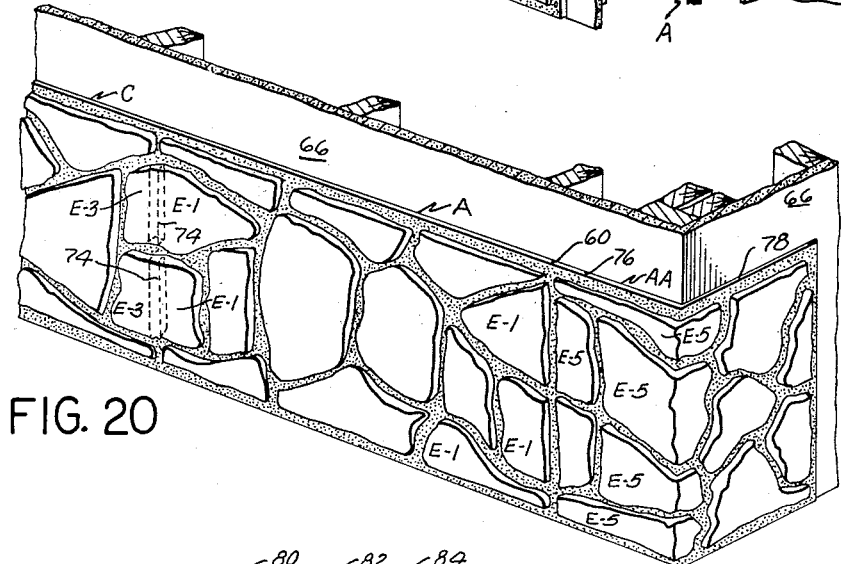
Figure 21:
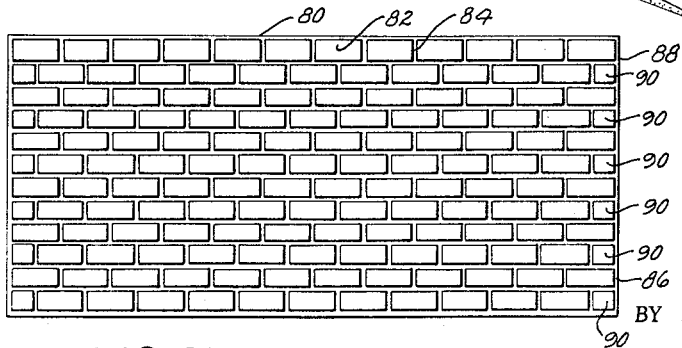
Figure 22:
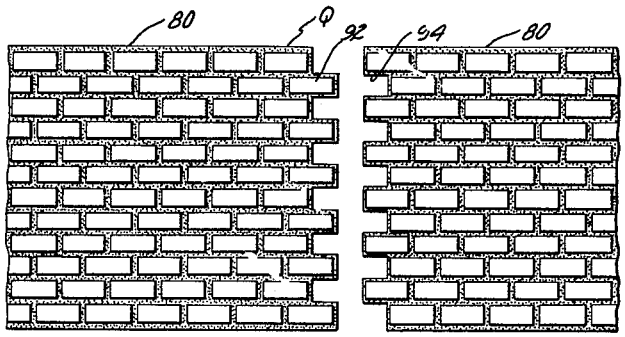
Figure 23:
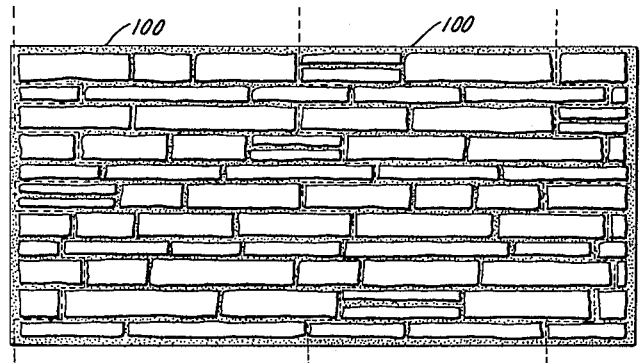
Figure 24:
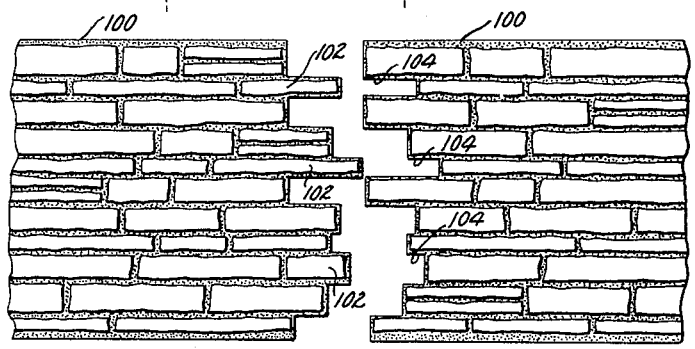
Figure 25:
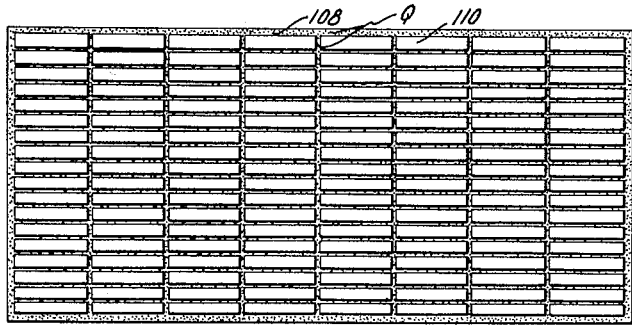

FIGURE 9 is a fragmentary perspective view of the resilient mold shown in FIGURE 8 after the resilient mold has been cured and stripped from the second master form and thereafter mounted in a rectangular frame, and with a mixture of a polymerizable resin, cement and talc that simulates the appearance of mortar applied as a first layer to the uppermost surface portions of the mold to depict the mortar joints shown in FIGURE 1 and to provide a rectangular margin which extends around the panel, which margin is also covered with the first layer of mortar-simulating material;

FIGURE 10 is a perspective view of the resilient mold with the first layer of polymerizable resin applied thereto, after a second layer of polymerizable resin, a catalyst, particled stone, and a mineral colorant has been applied to the mold to overlie the first layer, and after a third layer of a polymerizable resin, a catalyst, and randomly oriented Fiberglas have then been applied to the second layer for reinforcing purposes;

FIGURE 11 is an enlarged cross-sectional view of a section through the mold and three layers of material applied thereto taken on line 11—11 of FIGURE 10;

FIGURE 12 is a perspective view of the apparatus by which the three layers of polymerizable resinous material are applied to the resilient mold, with the mold for convenience in handling being mounted on a movable carriage;

FIGURE 13 is a perspective view of a carriage supporting two of the resilient molds as they are moved from the resin-applying apparatus shown in FIGURE 12 to the curing tunnel shown in FIGURE 14;

FIGURE 14 is a perspective view of the curing tunnel showing a carriage supporting two of the resilient molds that have been sprayed with the polymerized resins just being moved into the confines of the tunnel to be subjected to heat from the infra-red ray lamps therein to speed up the rate at which the polymerization of the resinous materials takes place;

FIGURE 15 is a perspective view of one of the molds after the resinous material defining the panel has cured, showing the rough marginal edges of the panel after being stripped from the mold;

FIGURE 16 is a perspective view of the panel illustrated in FIGURE 15 shown being passed through an enclosure where it is dusted with finely divided limestone that bonds to the still somewhat tacky surface thereof to impart a dull luster to the panel;

FIGURE 17 is a perspective view of the finished panel after a portion of the flat margin extending therearound has been removed before the panel is disposed in a desired position such as that shown in FIGURE 1;

FIGURE 18 is a perspective view of two of the panels shown in abutting end-to-end relationship and nailed to a supporting wall surface;

FIGURE 19 is an enlarged, cross-sectional view of the abutting portions of two panels showing the manner in which nails are positioned to extend through at least one of these portions to affix the panels to the wall structure;

FIGURE 20 is a perspective view of the panels shown in FIGURE 18, but with the free left-hand end of one of the panels illustrated in FIGURE 18 now shown abutting against the left-hand edge of an L-shaped corner piece, with the mortared stone design of this corner piece being such as to impart a three-dimensional effect to the simulated stone design therein;

FIGURE 21 is a front elevational view of a second form of panel which simulates the appearance of bricks mortared together;

FIGURE 22 is a front perspective view of two panels of the second form of the invention showing the mating end edge portions thereof;

FIGURE 23 is a front elevational view of a third form of panel that simulates cut stone;

FIGURE 24 is a front elevational view of two sections of the third form of the invention showing the mating end portions thereof;

FIGURE 25 is a front elevational view of a fourth form of panel which simulates the appearance of Roman brick;

FIGURE 26 is a perspective view of a fifth form of the invention illustrating a lift slab being formed with the panels shown in FIGURE 1 laid face down in the slab mold before the mold is filled with concrete;

FIGURE 27 is a perspective view of a lift slab as formed in the mold shown in FIGURE 26 showing the panels bonded to one surface thereof as an integral part of the slab;

FIGURE 28 is a perspective view of a part of a wooden form used in pouring a concrete wall structure, which form has panels as shown in FIGURE 1 lining the interior thereof, with the decorative faces of the panels being in opposing relationship and showing the form in the process of being filled with concrete; and FIGURE 29 is a concrete wall section formed by the means shown in FIGURE 28 after the wooden forms have been removed therefrom, which wall section is faced with the panels illustrated in FIGURE 1 and requires no grinding to smooth the same.

With continued reference to the drawings for the general arrangement of the invention, it will be seen that a first rectangular, dimensionally stable, lightweight, decorative building panel A is shown in FIGURE 1 that can be fabricated by means of the steps of a method illustrated in FIGURES 3 to 17 inclusive. Panel A has a forward surface that in relief, simulates the appearance of a plurality of rough stones E held together in a desired first pattern by layers of mortar F. A rectangular margin F' of imitation mortar extends around the portion E of panel A. The configuration of the exterior surfaces of panels A have the appearance of the stones E, and are true reproductions of actual stones, both as to the texture and imperfections of the stone, such as undercuts and the like.

The second, third and fourth panels B, C and D also have forward surfaces which present the appearance of a number of rough stones E bonded by layers of mortar F, but the stones and mortar in each of these latter panels are arranged in second, third and fourth patterns varying from that of the first panel, as illustrated in FIGURE 1. The individual patterns of the panel faces are so selected that butt portions of the stones E are disposed along the end and side edges of each panel. In addition, the patterns for the simulated stones in panels A to D inclusive are so designed that irrespective of which end edge or side edge of any one of the panels abuts against another, portions of simulated stone will be disposed adjacent one another in a manner to cooperatively present the appearance of a whole stone after the spaces between the stone portions have been filled with the same material of the same color from which the stone portions are formed.

Figure 2:
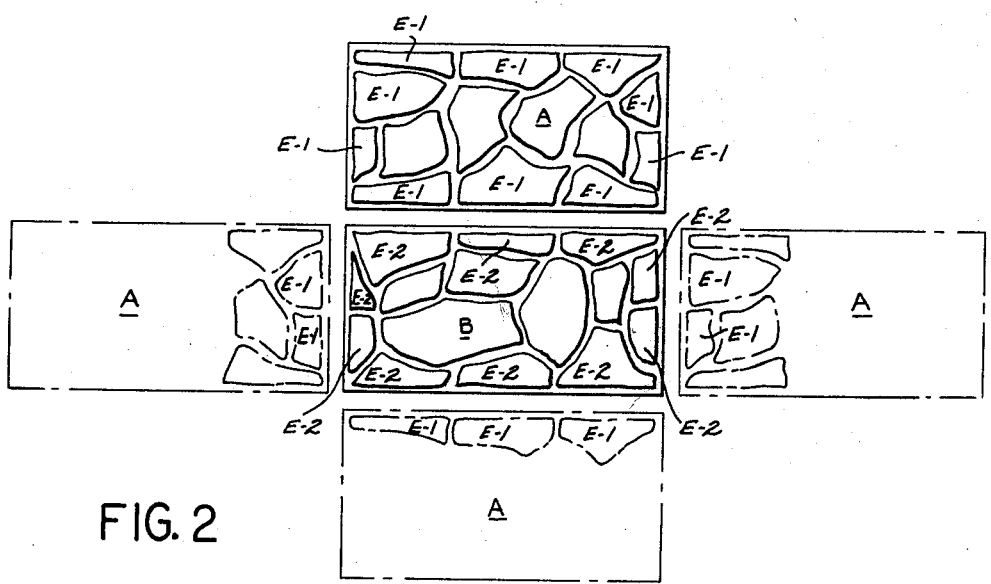
FIGURE 2 is a top plan view of a second one of the panels shown in FIGURE 1, with a first one of the panels shown in four adjacent positions relative thereto to illustrate the manner in which the design of one panel complements that of another, irrespective of how the panels may be arranged relative to one another.

The manner by which the simulated stone design of one panel cooperates with the design of another panel to complement the same and provide a unified surface configuration when the panels are juxtaposed may best be seen in FIGURE 2. As shown, the second panel B is disposed adjacent the upper longitudinal edge of first panel A. It will be seen that simulated stone portions E-1 of the first panel are of such size and configuration as to cooperate with simulated stone portions E-2 of the second panel B to provide whole stone portions E when the space between the stone portions E-1 and E-2 is filled with the same material as that defining the stone portions.

A series of simulated stone portions E-1 extend completely around the first panel A and that a series of simulated stone portions E-2 also extends around the edge portions of the second panel B. In FIGURE 2 a first panel A is shown in phantom line abutting against both ends of the second panel B as well as the lower longitudinal edge thereof. It will be noted that irrespective of how the first panel A may be placed in abutment with Panel B, the simulated stone portions E-1 of panel A are complementary to the adjacent stone portions E-2 of panel B. When these stone portions are joined by the same material from which they are formed, the panels A and B are, in effect, one continuous wall surface and it is impossible to detect the junction therebetween, after additional mortar material F has been added along the junction line to cover the nails (FIGURE 18).

The structure and composition of each panel A, B, C and D are exactly the same, other than the pattern of stones E, and accordingly only the construction of the first panel A will be described herein.

Figure 3:
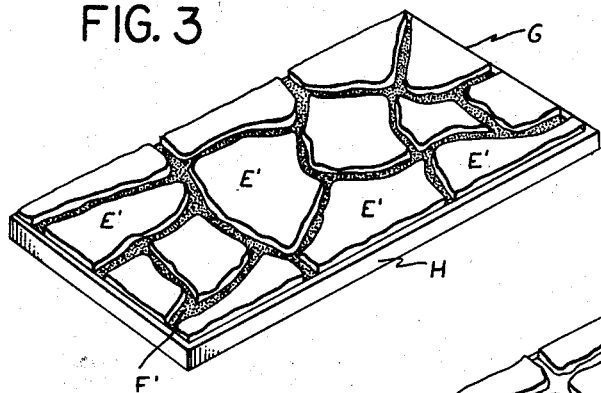
FIGURE 3 is a perspective view of a section of a mortared stone wall that serves as a basis for the reproduction of the second panel shown in FIGURE 2.

The first step in forming the panel A is to actually fabricate a section of stone wall G, as shown in FIGURE 3, comprised of real, rough stones E' which are bonded together in a desired first pattern by layers of mortar F. For convenience in handling this actual stone wall section and to protect it against inadvertent breakage should it be dropped, the section is preferably encased in a wooden reinforcing framework H, also shown in FIGURE 3.

After the stone section G has been formed, the frame H is disposed in a convenient location and the entire upper exterior surface of the section G is sprayed with a polymerizable resin, a catalyst, and Fiberglas mixture J through a nozzle K to deposit a layer of this mixture thereon. After being so deposited, the mixture J polymerizes due to the action of the catalyst, and may thereafter be stripped from the section G to be used as a first master form L.

Figure 6:
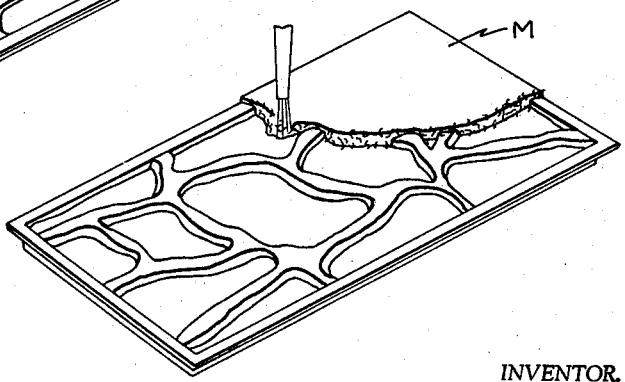
FIGURE 6 is a perspective view of the master form shown in FIGURE 5 after a mixture of polymerized resin and Fiberglas fibers have been applied thereto.

A polymerizable resin, catalyst, and randomly oriented Fiberglas mixture is then discharged onto form L to deposit a layer thereof over the entire surface of the form. When this second layer of material polymerizes, it is stripped from the form L to be used as a second master form M, as shown in FIGURES 6 and 7. Any desired number of second master forms M can be made from the first master form L by following this procedure.

As illustrated in FIGURE 7, master form M is enclosed within the confines of a rectangular framework N. A heat-curable, soft rubber material is then applied to the upper surface of form M through a nozzle O or the like, until this rubber material is of sufficient depth to completely envelop the upper surface of this second master. The heat-curable material so applied can be Plastiflex or other material of a like nature which, when cured, is tough but resilient and is able to withstand elevated temperatures for a prolonged period of time.

After the soft rubber material has been so applied and heat cured, it is stripped from the master M and the flat surface 10 thereof placed in a downward position in a rectangular frame 12, as shown in FIGURE 9, whereby the rubber material defines a mold P for use in forming the first panel A illustrated in FIGURE 1. The outlines of the mortar layers F in panel A will, in mold P, be defined by a number of upwardly extending ribs 14 that are connected to one another, which define the boundaries of a number of recesses 16 in the mold P, each of which outline the surface of one of the simulated stones E when the formation of the panel is performed, as will hereinafter be described.

The first step in forming the panel A by means of the mold P is to coat the upper surfaces of the ribs 14 and a rectangular flat margin within the confines of which they are disposed with a mixture of a vinyl paint, glue, cement and talc. This mixture polymerizes to a hard body, which is the mortar simulating material F. When this mixture is applied as above described it constitutes a first layer F. Thereafter, a mixture of a polymerizable resin, catalyst, particled stone, mineral colorant and other materials to be described hereinafter is sprayed onto the upper surface of mold P and over the first layer F to form a second layer R.

A third layer S is then applied to the upper surface of second layer R as shown in FIGURE 10, and this third layer includes at least a polymerizable resin, a catalyst, and a substantial quantity of randomly oriented Fiberglas strands. When the resin in layer S is polymerized, it has high tensile strength and serves to reinforce both the first layer Q and second layer R. The layer S is applied directly to layer R, and this second layer in turn is applied directly to the first layer F.

After the panel A comprising the three layers F, R and S has been fabricated, each of which layers includes a polymerizable resin, each panel is subjected to heat in a curing tunnel T, which is illustrated in FIGURE 14. Although the catalyst included with the resins defining the panel would, even at room temperature cause polymerization of the resins by an exothermic reaction, exposure to the additional heat applied thereto in the tunnel T speeds up this reaction to the extent that the polymerization takes place in minutes rather than hours. Inasmuch as the polymerization occurs when the first, second and third layers F, R and S are in contact with one another, these layers bond together sufficiently during polymerization as to be considered formed from a single integral sheet of resinous material. The first layer F (FIGURE 9) can be applied to the upper surfaces of ribs 14 and margin 15 by a roller 20, brush or the like.

Application of layers R and S to one of the molds P is preferably carried out in a booth U, as shown in FIGURE 12, which includes two vertical end walls 22, a back wall 24, and an elevated horizontal roof 26 that extends between the upper extremities of the two side walls. Three cylindrical receptacles V–1, V–2, and V–3 are disposed above the upper surface of the roof 26, and by conventional means (not shown), are adapted to be vibrated. An opening is formed in the lower portion of each receptacle V–1, V–2 and V–3, from which troughs W–1 and W–3 extend downwardly and forwardly to empty into a funnel-shaped receptacle 30. Means (not shown) support receptacle 30 in a fixed position relative to the booth U.

A commercially available plastic discharge gun X which is sold under the trademark "Sealzit" or "De Vilbiss" is provided which is adapted to be connected to a source of air under pressure. When air under pressure is caused to discharge through the gun X by manipulation of a handle or trigger forming a part thereof, a polymerizable resin is drawn from a storage space (not shown) and caused to discharge onto a desired surface.

In the fabrication of the present invention it has been found desirable to use a resin such as that known by the trademark Vibrin 924, which is a rigid, cross-linked polyester, thermosetting plastic manufactured and sold by the Naugatuck Chemical Division of the United States Rubber Company, 1230 Avenue of the Americas, New York 20, New York. This thermosetting plastic has cobalt mixed therewith.

The gun X is capable of receiving Fiberglas roving Y, which is chopped into desired lengths and discharged from the gun when desired. Gun X also includes a third tub (not shown) through which methyl ethyl ketone peroxide discharges under pressure and mixes with the thermosetting plastic forwardly of the gun. When mixed, the methyl ethyl ketone peroxide and cobalt in the plastic serve as the catalyst for the polymerization of the resin. The detailed structure of gun X is not shown as it is an item commercially available on the present-day market.

Particled stone is contained in receptacles V–1, V–2 and V–3. Also, a colorant is added to the particled stone in these receptacles, which is normally a mineral oxide that will not fade or discolor when incorporated in the structure of one of the panels A, B, C or D. Each of the receptacles V–1, V–2 and V–3 can be individually vibrated to cause particled stone of a desired color to discharge through the particular trough W–1, W–2 or W–3 associated therewith into the funnel-shaped receptacle 30. The vibrators can also be operated concurrently to discharge particled stone of different colors into the funnel-shaped receptacle 30 to obtain a blend thereof. Thus, by controlling the flow of particled stone from the receptacles V–1, V–2 and V–3, a mixture thereof is provided in the funnel-shaped receptacle 30 that is of a desired shade or color, which in turn discharges from receptacle 30 through a tube 32 to be discharged from a spray nozzle 34 disposed adjacent the discharge tube portions of the gun X through which the polymerizable resin, the catalyst and chopped roving are ejected.

Figure 4:
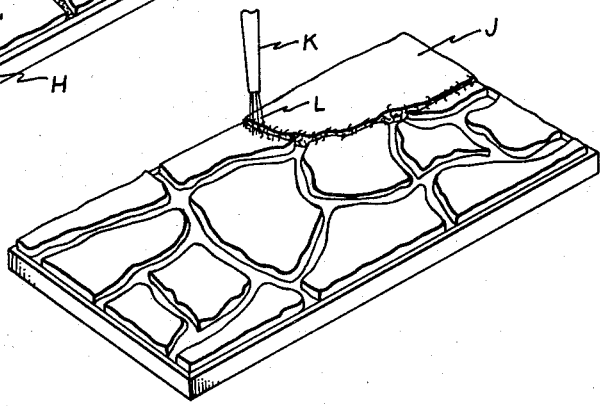
FIGURE 4 is a perspective view of the stone panel shown in FIGURE 3 on which a layer of a polymerizable resin and Fiberglas has been sprayed to provide a master form.
Figure 5:
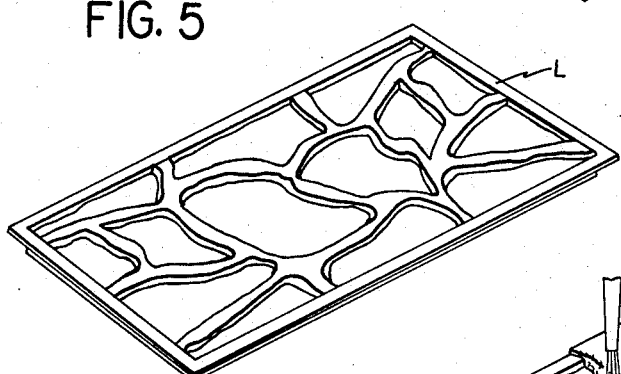
FIGURE 5 is a perspective view of the master form after the resin has polymerized and the master form has been stripped from the stone section shown in FIGURE 4.

Spraying of layers R and S onto the mold P is most conveniently carried out while the mold is supported on a manually movable carriage Z shown in FIGURE 4. The carriage Z includes a rectangular bed 36 having legs 38 extending downwardly from the corners thereof, and the lower ends of the legs terminate in casters 40. The Fiberglas is preferably supplied to the gun X in the form of roving Y that is purchased commercially on spools 42, one of which is shown rotatably supported in FIGURE 12, with the roving extending upwardly therefrom through guides 44 to the gun X. When gun X is actuated, a rotor (not shown) in the gun chops the roving into strands of desired length. The strands of roving become separated from one another and randomly oriented as they are discharged from the gun, together with the resin and catalyst.

After three layers of polymerizable resin has been applied to the upper surface of mold P as outlined hereinabove, the mold, together with the frame 12 is mounted on a carriage 46. Carriage 46 is preferably of such size as to support at least two of the molds P, as shown in FIGURE 14. Carriage 46 and molds P are then moved into the curing tunnel T. Carriage 46 includes a flat bed 50 having four legs 48 which extend downwardly from the corners thereof, and the lower ends of legs 48 are supported on casters 52.

Curing tunnel T comprises two side walls 54 and a horizontal top 56. Two longitudinally extending banks 58 of infra-red lights 60 are disposed within the curing tunnel T. Each bank 58 of lights 60 may, by means of vertically adjustable rods 61 projecting upwardly through top 56 be vertically adjusted relative to the molds P which are coated with the three layers Q, R and S. The height of the infra-red lights 60 relative to the molds P during the time the molds are in the tunnel T determines the intensity of the heat to which the layers of polymerizable material F, R and S will be subjected, and this heat determines the speed at which the exothermic polymerization of the three layers will take place.

When the curing cycle in tunnel T is completed, the carriage 46 and molds P are removed therefrom and the resinous material covering the molds is subjected to a rough trimming operation as illustrated in FIGURE 15 to remove surplus marginal material 65 therefrom. The exterior vertical surfaces of framework N can serve as a guide for this rough trimming of surplus material from the cured panel A, B, C or D.

Thereafter the cured panels are moved through a slotted enclosure 63 where both surfaces thereof are dusted with a finely divided stone, such as limestone dust. This limestone dust adheres to the somewhat tacky surface of the polymerized panels A, B, C or D and removes the shine therefrom and imparts a dull luster thereto.

When the panels A, B, C or D have been rough trimmed, they still have a margin 67 that is wider than necessary when the panels are placed in abutting relationship on a wall surface, as shown in FIGURES 18, 19 and 20. This margin 67 of excess width is desirable for protective purposes during shipment of the panels. After the panels A, B, C or D are on the job site, the outer portion 67a of the margin 67 is trimmed therefrom to leave a finished margin 69 that will be approximately ¼" in width. This margin 69 is, of course, defined by the three layers of resin F, R and S previously mentioned, with the mortar-simulating layer F being the outermost one which is visible when the panels are disposed as shown in FIGURES 18, 19 and 20.

The first panel A or any one of the other panels B, C or D fabricated as above described, are then preferably allowed to complete the polymerization of the resin therein at room temperature, which is normally completed within a twelve-hour period. Thereafter, panels A, B, C and D are sufficiently hard and tough as to be walked on and subjected to relatively severe blows without damage thereto. In the event any one of the panels need to be cut at the time of installation, this is easily and quickly performed by use of a hand saw or the like.

After the panels A, B, C or D have been trimmed to define the margins 69, they are disposed against a wall surface 66 or other desired structure, and preferably held in place thereon by nails 68. Nails 68 are driven through at least one of the margins 69 of one of the panels, as best shown in FIGURES 18 and 19. The installing of the panels A, B, C or D and the affixing thereof to a wall surface by means of nails 68 may vary, depending on the skill of the person making the installation.

One method of installation is to completely remove the margin 69 from one end of a panel (FIGURE 19), and abut the vertical downwardly extending edge portion 70 of this panel against the outer extremity of the margin 69 of another panel, through which margin nails 69 are driven into the wall surface 66. In FIGURE 19 the margin 69 is shown as being removed from panel C, with the portion 70 of this panel abutting against the outer edge of margin 69 of panel A. Thereafter, the heads of nails 68 are covered by an application of a liquid mixture of the same materials which define the mortar-simulating layer F. Should it be desired to completely bond the adjoining edge portions of the panels when in abutting contact, the small crack or crevice 71 that may exist between the end portion 70 of a panel and the outer edge of the margin 69 may be filled with the same mortar-simulating material used to cover the heads of nails 68.

Another method of uniting the panels is to leave portions of the margins 69 on both the panels which are placed in abutting contact, and after the margins have been nailed to the desired surface, any visible crack or crevice between the adjoining edges of the margins may be concealed by applying a liquid material of the same composition used in forming the first layer F. Also, if more convenient the margins 69 on adjoining panels may overlap one another and then be nailed into place. However, this is a more difficult operation than those previously described, for a driving member (not shown) must be used to complete the positioning of the nails in the surface 66 after the nail heads are disposed below the level of the layers S of the panels, as will be apparent from the inspection of FIGURE 19.

When the panels A and C have been affixed to the surface 66 as shown in FIGURE 18, the vertical junction line defined by the margins 69 are readily apparent. This straight junction line between the simulated stones E–1 in panel A and E–3 in panel C is eliminated by applying a paste of exactly the same composition and color as the material defining the simulated stone portions E–1, E–3 between these stone portions and allowing the paste to polymerize to a hard mass. After this operation has been completed, the visible junction between ends of the panels A and C is completely masked, as illustrated in FIGURE 20. The polymerizable material applied between the simulated stone portions E–1 and E–3 overlies the mortar-simulating material F which was visible in FIGURE 18 and separated the simulated stone portions. For purposes of clarity regarding this operation, the filled portion between the stone portions E–1 and E–3 is shown in FIGURE 20 by dotted line and indicated by the numeral 74.

In many installations the panels will cover two wall surfaces 66 that are disposed normal relative to one another, as may best be seen on the right-hand end of the structure shown in FIGURE 20. When such a situation arises, corner pieces A—A are provided of the same structure as that of panels A, B, C and D, other than that each corner piece A—A has a first wall section 76 and a second wall section 78 disposed normal relative thereto. The pattern of simulated stone E and mortar F in the corner pieces is so arranged as to match up with the patterns of any one of the end portions of the panels A, B, C or D. The pattern of the simulated stone and mortar on the second wall secton 78 is so laid out as to conform to the end surfaces of the rough stone replicas E–5 of the first wall section 76 of the corner piece A—A.

Abutment of the right-hand end of panel A to the corner piece A—A is achieved in the same manner as the abutment of the end of panel A to the end of panel C as shown in FIGURE 18 and described hereinabove. It will be obvious that upon completion of the installation of panel A and corner piece A—A shown in FIGURE 20, the simulated stone portions E–1 on the right-hand end of panel A would be joined to the simulated stone portions E–5 on the left-hand end of the first wall section 76 of the corner piece when the polymerizable paste material previously described is applied between these stone portions to unite them in the same manner as the portions E–1 were united to stone portions E–3 on the left-hand end of the panel A.

A second form of the invention is shown in FIGURE 21, which is a panel 80 that is of the same structure as the panels A, B, C and D, other than panel 80 has a pattern of bricks 82 formed thereon which are separated by simulated layers of mortar 84, with the exterior edge portions of the panel being defined by flat margins 86 that are also covered with a mortar-simulating material. Formation of the second form of the invention is identical to that described in connection with the panels A, B, C and D, except that the initial wall section used to form the first master would be a section of a mortared brick wall rather than a section of a mortared stone wall.

When a panel 80 is used, the junction between the vertically disposed end 88 thereof and a similar end of an adjoining panel 80 is best effected by cutting half bricks 90 therefrom, and so trim the end of an adjacently disposed panel of the same general brick configuration that whole brick portions (not shown) extend into the recesses formed in the panel 80 when the half brick portions 90 are removed therefrom. In practice this has been found to be a tedious operation. A more desirable method of effecting a junction between one panel 80 and a second panel 80 having brick exterior decorative surfaces is to actually fabricate the panels with irregular end edges, with the end of the panel 80 (FIGURE 22) having a number of vertically spaced, outwardly projecting portions 92 that simulate portions of a whole brick which are insertable in recesses 94 formed on the left-hand edge portion of the panel 80 situated to the right, as shown in FIGURE 22. When the two panels 80 and the edges defining the projections 92 and recesses 94 are placed in abutment, these projections and recesses 94 interengage and a junction is effected that is not visible when the operation previously described in connection with the panels A and C is carried out. Panels 80 may then be affixed to a desired wall surface by the use of nails 68 in the same manner as shown in FIGURES 18, 19 and 20. The heads of nails 68 are thereafter preferably concealed by applying a polymerizable liquid material that will cure at room temperature which will have the same appearance when cured as that of the material of panels 80 which simulates the appearance of mortar.

A third form of the invention is shown in FIGURES 23 and 24 which comprises panels 100 of the same structure as panels A, B, C and D, other than that the exterior surfaces of panels 100 simulates the appearance of cut stone held together by mortared joints. Like those of the second form of the invention, the panels of the third form are formed with end edges having extensions 102 projecting therefrom that are adapted to be inserted in recesses 104 formed in the adjacent end portion of a second one of these panels, as illustrated in FIGURE 24. Panels 100 comprising the third form of the invention are used in the same manner as the panels A, B, C and D, and are preferably affixed to a wall surface by means of nails 68, with the heads thereof being covered by applying a polymerizable paste which simulates the appearance of mortar after it solidifies.

A fourth form of the invention is shown in FIGURE 25 which is structurally identical to panels A, B, C and D except that the exterior surface thereof simulates the appearance of mortared Roman brick. The panel 106 shown in FIGURE 25 has a margin 108 extending therearound which is covered with the material F to present the appearance of mortar. The material F also extends between the simulated bricks 110 formed on the exterior surface of panel 106. The panels of the fourth form of the invention are preferably nailed to a desired surface in the same manner as the panels shown in FIGURE 19.

A fifth form of the invention is illustrated in FIGURES 26 and 27, which includes a slab 112 formed from concrete or other structural material. Slab 112 is preferably of a size employed in the lift slab type of construction, and accordingly is of substantially greater transverse cross section than that of one of the panels A, B, C or D shown in FIGURE 1.

Fabrication of slab 112 is accomplishd byq use of a rectangular form 113 having a bottom 114 from which end walls 116 and side walls 118 project upwardly. Panels A, B, C or D, or any of the other panels previously described are placed in abutting contact in form 113 to cover the bottom 114. When so positioned, the third layers S of these panels face upwardly. The contact that is to define slab 112 is then poured into the form 113 and allowed to set in direct contact with the panels. After the concrete has set, the slab 112 in which the panels A, B, C and D is bonded as an integral part thereof is removed from the form 113. The portions of simulated stones at the adjoining edges of the panels are then filled with a paste of polymerizable material of the same composition and color as that of the second layer R, and in the same manner as previously described in connection with FIGURES 18, 19 and 20.

A sixth form of the invention is shown in FIGURES 28 and 29 wherein a number of the panels A, B, C or D, or others of the previously described panels, are placed in abutting contact to line the vertical interior surfaces of a form 120 that is to be used to pour a concrete wall 122. The third layers S of the panels are adjacently disposed, and the concrete wall is poured therebetween. After the concrete has set, the form 120 is removed, exposing the panels firmly bonded to the wall 122 and forming an integral part thereof. The use of the panels in this manner eliminates the necessity for grinding the vertical surfaces of the concrete wall 122, which is an expensive and time-consuming operation.

Inasmuch as the primary function of the panels above described is that of being decorative and resembling as closely as possible the appearance of real stone, brick and mortar, both visually and by touch, the formulas used in forming the first, second and third layers F, R and S will vary, depending upon the color and texture of the brick or stone that is to be simulated. The material comprising the first layer F which presents the appearance of mortar is a mixture of vinyl paint, glue, Portland cement, powdered talc, and a mineral colorant if the same is found to be necessary to impart the desired color to the first layer when solidfied.

The second layer R is composed of a number of different elements that are brought together and initially mixed in front of the gun X and almost immediately after mixing, impacted onto the upper surface of the mold P and first layer F that has already been used to coat a portion thereof. Layer R includes a thermosetting resin such as Vibrin 924 having cobalt as a part thereof; methyl ethyl ketone proxide which, in the presence of cobalt, cooperates therewith to provide a catalyst to polymerize the resin; small particled limestone aggregate that is bonded together by the resin as the resin polymerizes; a mineral colorant or colorants that are preferably oxides and give a desired color to the mixture as it is sprayed onto the mold P.

In the event it is desired to provide a fireproof panel, antimony trioxide and chlorowax are added as elements to the second layer R. Chlorowax is the trademark of a chlorinated paraffin manufactured by the Diamond Alkali Co., 300 Union Commerce Building, Cleveland, Ohio. Chlorowax decomposes slowly at approximately 135° C. with evolution of hydrogen chloride.

The third layer S comprises the same elements included in the second layer, but also includes a substantial quantity of randomly oriented Fiberglas strands that are embedded in the resin with the aggregate. The Fiberglas is added to the resin in such quantities to give the desired tensile strength to the panels above described after polymerization of the resins.

It will be apparent that if desired, Fiberglas strands could be included in both the layers R and S, and in effect, would then constitute a single second layer. However, no advantage is attained by such a construction, for the Fiberglas strands used would be far in excess of the quantity required to give the maximum tensile strength to the panels when they are used for decorative, weatherproof or fireproof purposes in a building structure. In addition to the elements mentioned above comprising layers R and S, extenders may also be used as is conventional in plastic spraying operations to obtain a layer of deposited resin of the desired physical characteristics.

The percentage of components in the first layer F may vary. However, this variation can take place only to the extent that the material defining the layer F is liquid prior to solidification thereof and can be rolled or brushed onto the upper surfaces of the ribs 14 and the margin surrounding the frame. Also, the material defining the layer F must be liquid prior to solidification to permit the use thereof to mask nail heads or the exposed parts of fasteners, as well as effect a seal at the junction between two of the panels.

The percentage weight of the components in the two layers R and S may also be varied. However, this variation in the percentage of components in the second layer R will be limited to the extent that the polymerized second layer must have the appearance and feel of the brick or stone it simulates. The components of the third layer S may also be varied so long as this third layer, when polymerized, is tough and resilient and has substantial tensile strength.

The use of the invention has been described in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. A method of forming a decorative building panel that will have an exterior surface simulating in relief true reproductions of a plurality of shapes bonded by mortar joints consisting essentially of the following steps:
   (a) providing a resilient mold which contains a portion having impressions of shapes, complementary ridges and undercuts–
   (b) applying to the surface of said mold a layer consisting of a polymerizable resin, a polymerization catalyst, a colorant and rock particles, which first layer when polymerized becomes solidified;

(c) spraying on the surface of said first layer a second layer consisting essentially of a polymerizable resin, a polymerization catalyst, and a plurality of randomly oriented fiber glass strands, which second layer when polymerized becomes bonded to the first layer;
(d) polymerizing said two layers to solidify them into an integral panel;
(e) stripping said mold from said panel;
(f) and, dusting the exterior surface of the panel with rock dust to give a dull finish thereto.

2. The method of forming a decorative building panel according to claim 1 which also includes the further step of applying a film of vinyl resin paint to the upper surfaces of the ridges of the mold prior to applying said first layer.

References Cited by the Examiner
UNITED STATES PATENTS

| | | | |
|---|---|---|---|
| 2,063,935 | 12/36 | Kirschbraun | 50—271 |
| 2,164,725 | 7/39 | Snyder | 50—271 |
| 2,819,495 | 1/58 | Krausz | 18—60 |
| 2,964,800 | 12/60 | Dorsett | 18—60 |
| 3,055,148 | 9/62 | Christy | 264—255 |

ROBERT F. WHITE, *Primary Examiner.*

WILLIAM I. MUSHAKE, ALEXANDER H. BRODMERKEL, *Examiners.*